United States Patent Office 2,907,790
Patented Oct. 6, 1959

2,907,790

N,N'-THIOBIS(ETHYLENE)-BIS(2-(o-HYDROXY-PHENYL)GLYCINE) COMPOUNDS

Albert E. Frost, Millis, Mass., assignor to The Dow Chemical Company, Midland, Mich., a corporation of Delaware No Drawing. Application September 19, 1958
Serial No. 761,954

6 Claims. (Cl. 260—516)

The present invention is directed to N,N'-thiobis (ethylene)-bis[2-(o-hydroxyphenyl)glycine] represented by the formula

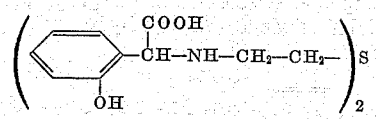

and its dihydrohalide salts. By the expression "hydrohalide" is meant hydrochloride or hydrobromide. The products of the present invention are white or light colored solids, substantially insoluble in water and organic solvents and soluble in aqueous acids and alkalies. The compounds are useful as chelating agents, complexing with ferric iron in acid solution to produce a deep violet color and in moderately acid to moderately alkaline pH to produce a wine-red colored solution. The compounds are also useful as parasiticides and particularly as herbicides.

The products of the invention may be prepared by reacting salicylaldehyde and bis($\beta$-aminoethyl) sulfide to produce an intermediate bis($\beta$-salicylaldiminoethyl) sulfide which when reacted with hydrogen cyanide produces N,N' - thiobis(ethylene)-bis[2-(o-hydroxyphenyl)glycinonitrile]. The latter on hydrolyzing with hydrohalic acid, HX, wherein X is chlorine or bromine, produces the dihydrohalide salt of N,N'-thiobis(ethylene)-bis[2-(o-hydroxyphenyl)glycine]. The free N,N'-thiobis(ethylene)-bis[2-(o-hydroxyphenyl)glycine] may be obtained by neutralizing the dihydrohalide salt with alkali. The above reactions may be represented by the following equations:

I
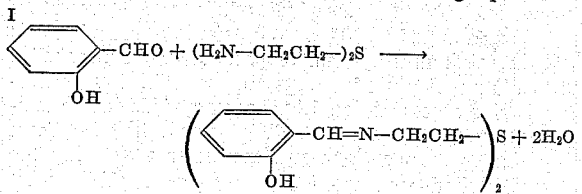

II
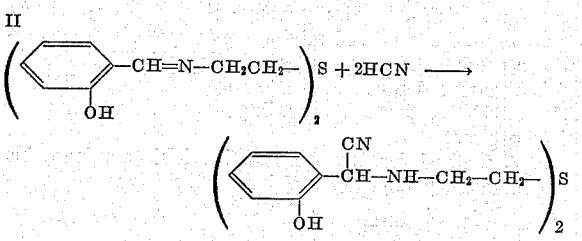

III
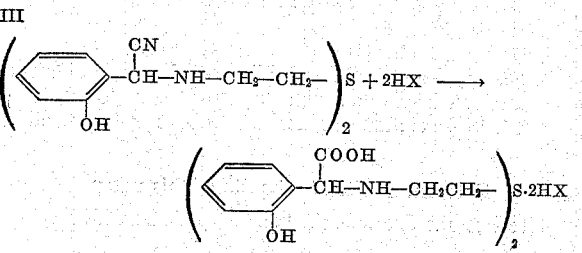

IV
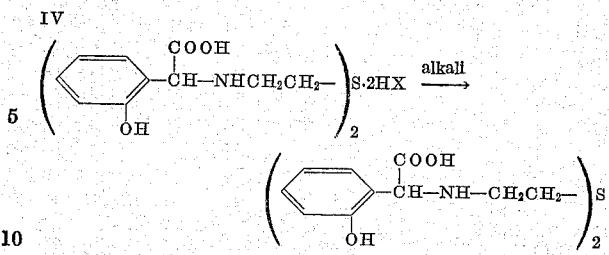

In carrying out the first step of the reaction, good results are obtained when about two molar proportions of salicylaldehyde and one molar proportion of bis($\beta$-aminoethyl) sulfide are employed. A solvent is conveniently employed in carrying out the reaction. Suitable solvents include ethyl alcohol, and isopropyl alcohol. The reaction may be carried out in the temperature range of from 15° C. to 80° C. On mixing the reactants in a solvent, heat is given off; after the initial exothermic reaction has subsided, the mixture is heated to the boiling temperature of the solvent for about 5 to 30 minutes to complete the reaction to produce the intermediate bis($\beta$-salicylaldiminoethyl) sulfide product. The latter subsequently precipitates as a yellow crystalline solid when the reaction mixture is cooled.

The second step is carried out by employing four-to five-fold molar excess of liquid hydrogen cyanide for each molar proportion of bis($\beta$-salicylaldiminoethyl) sulfide. The reaction is carried out in the temperature range of about 0° C. to 25° C. for a period of about ten minutes to one hour. The preferred conditions are from 0° C. to 10° C. for a period of one hour. A reaction takes place with the separation of a N,N'-thiobis (ethylene)-bis[2-(o-hydroxyphenyl) glycinonitrile] product as a yellow oil. Excess hydrogen cyanide is then removed by vaporization while the temperature is maintained below 26° C. to recover the product as a viscous yellow oil.

In the third step of the reaction a molar excess of acid is intimately mixed with N,N'-thiobis(ethylene)-bis[2-(o-hydroxyphenyl) glycinonitrile] product obtained in Step II. In carrying out this step, the glycinonitrile product is preferably mixed with the acid in the temperature range of from 0° to 85° C. The glycinonitrile is thermally unstable and decomposes rapidly above room temperature; thus it is desirable that the initial steps of the hydrolysis be carried out at a low temperature and that the reaction mixture not be maintained above room temperature for a prolonged period. Conveniently, glycinonitrile is mixed with the acid in the temperature range of from 0° to 10° C. until a homogeneous solution is obtained, thereafter gradually increasing the temperature to room temperature and finally heating the mixture at about 75° to 85° C. for about 10 to 15 minutes. The glycinonitrile product is than allowed to cool whereupon the acid salt product of N,N'-thiobis(ethylene)-bis[2-(o-hydroxyphenyl)glycine] precipitates in the reaction mixture. The latter may be recovered in a conventional manner.

If the free N,N'-thiobis(ethylene)-bis[2-(o-hydroxyphenyl)glycine] is desired, the reaction mixture of the acid salt obtained in Step III is adjusted to about pH 2 with dilute alkali whereupon the glycine product precipitates as a white or light colored product. The latter may be recovered by filtration or decantation.

In the preferred method of carrying out the reaction two molar proportions of salicylaldehyde and one molar proportion of bis($\beta$-aminoethyl) sulfide is intimately mixed in a suitable solvent. After the initial exothermic reaction has subsided, the mixture is heated to the boiling point and then cooled to precipitate the bis($\beta$-salicylaldiminoethyl) sulfide product. The latter is recovered by filtration and excess liquid hydrogen cyanide added thereto while the temperature is maintained at from about 0° to 5° C. The mixture is allowed to stand in the temperature range of 0° to 5° C. for about one hour and thereafter the hydrogen cyanide removed by vaporization. Concentrated hydrohalic acid is added to the residue and mixed therewith at a temperature in the range of from 0° to 10° C., and thereafter warmed on the steam bath for about ten minutes. The mixture is then cooled to precipiate the dihydrohalide salt of N,N'-thiobis(ethylene)-bis[2-(o-hydroxyphenyl)glycine]. The latter may be recovered by filtration and decantation or vaporization and purified by recrystallization from alcohol. If the free N,N' - thiobis(ethylene) - bis[2 - (o-hydroxyphenyl) glycine] is desired the hydrohalide salt product is neutralized by adding aqueous alkali until the pH of the resulting mixture is about 2. The product may be recovered by decantation or filtration.

The following examples illustrate the invention but are not to be construed as limiting.

*Example 1.—N,N'-thiobis(ethylene)-bis[2-(o-hydroxyphenyl)glycine] dihydrochloride*

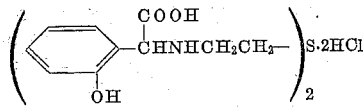

24 grams (0.2 mole) of bis(β-aminoethyl) sulfide was added to a solution of 48.8 grams (0.4 mole) of salicylaldehyde in 100 milliliters of ethanol. A reaction occurred with evolution of heat. The mixture was then heated to the boiling point and then cooled in an ice bath whereupon a bis(β-salicylaldiminoethyl) sulfide intermediate product having a melting point of 78°–79° C. precipitated in the reaction mixture as a yellow crystalline solid. The yield of the intermediate product was 53 grams or 81 percent of theoretical.

About a four to five-fold excess of liquid hydrogen cyanide was added to 2 grams (0.006 mole) of the sulfide intermediate product above prepared while the temperature was maintained at from 0° to 5° C. A reaction took place with the dissolution of the sulfide intermediate followed by the precipitation of a yellow oil. The mixture was allowed to stand for one hour at from 0° to 5° C. to complete the reaction and the hydrogen cyanide then vaporized to recover a N,N'-thiobis(ethylene)-bis[2-(o-hydroxyphenyl)glycinonitrile] intermediate product as a viscous yellow oil.

10 milliliters of concentrated hydrochloric acid was added with stirring to the residue above obtained while the mixture was kept in the temperature range of 0° to 5° C. The mixture was stirred for an additional ten minutes while the mixture was maintained at this temperature whereupon the glycinonitrile intermediate dissolved completely. Thereafter, the mixture was allowed to warm to room temperature, maintained at room temperature for 10 minutes, then heated on a steam bath (75°–85° C. for an additional 10 minutes. The mixture was then cooled in an ice bath to precipitate a N,N'-thiobis(ethylene)-bis[2-(o-hydroxyphenyl) glycine]-dihydrochloride product. The product has a molecular weight of 493.

*Example 2.—N,N' - thiobis(ethylene)-bis[2-(o-hydroxyphenyl)glycine]*

Dilute aqueous alkali was added to the reaction mixture containing N,N' - thiobis(ethylene) - bis[2 - (o - hydroxyphenyl)glycine]-dihydrochloride product until the pH of the solution was 2 whereupon a N,N'-thiobis(ethylene)-bis[2-(o-hydroxyphenyl)glycine] product precipitated as a white powder. The latter was recovered by filtration and had a melting point of 232°–234° C. (with decomposition).

In a reaction carried out in a manner similar to that described in Example 1 but wherein hydrobromic acid is employed for hydrolysis, the dihydrobromide salt of N,N' - thiobis(ethylene)-bis[2-(o-hydroxyphenyl)glycine] may be obtained.

The products of the invention may be employed as a parasiticide, such as for the control of southern armyworm (*Prodenia eridania*). They are also useful in many operations requiring chelating agents. They may also be supplied as a preformed iron chelate for various uses of iron chelates.

The compounds are particularly useful as herbicides for the control of the growth of germinant seeds and seedlings. In a representative operation, N,N'-thiobis(ethylene)-bis[2-(o-hydroxyphenyl)glycine] was employed for the control of rape seed. In such operations, substantially complete controls were obtained when a bed seeded with rape seed was treated with an aqueous dispersion containing 100 parts of N,N'-thiobis(ethylene)-bis[2-(o-hydroxyphenyl)glycine] per million parts of dispersion and observed after 11 days.

I claim:

1. A compound selected from the group consisting of N,N' - thiobis(ethylene)-bis[2-(o-hydroxyphenyl)glycine having the formula

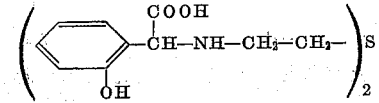

and its dihydrohalide salts, said dihydrohalide salts being selected from the group consisting of dihydrochloride and dihydrobromide salts.

2. N,N' - thiobis(ethylene)-bis[2-(o-hydroxyphenyl) glycine].

3. N,N' - thiobis(ethylene)-bis[2-(o-hydroxyphenyl) glycine]·dihydrochloride.

4. N,N' - thiobis(ethylene)-bis[2-(o-hydroxyphenyl) glycine]·dihydrobromide.

5. A method for preparing N,N'-thiobis(ethylene)-bis[2-(o-hydroxyphenyl)glycine]·dihydrohalide having the formula

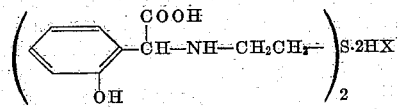

wherein X is selected from the group consisting of chlorine and bromine which comprises (1) intimately mixing together in a suitable solvent substantially two molar proportions of salicylaldehyde and substantially one molar proportion of bis(β-aminoethyl) sulfide in the temperature range of from 15° to 80° C. to obtain an intermediate bis (β-salicylaldiminoethyl) sulfide product, (2) mixing the intermediate sulfide product thus obtained with four to five-fold molar excess of liquid hydrogen cyanide in the temperature range of from 0° to 25° C. for a period of from 10 minutes to one hour and thereafter vaporizing the unreacted hydrogen cyanide to recover a N,N'-thiobis (ethylene)-bis[2-(o-hydroxyphenyl)glycinonitrile] intermediate product and (3) mixing the intermediate glycinonitrile product with excess hydrohalic acid, HX, wherein X is as above defined, in the temperature range of from 0° to 85° C., thereafter cooling to precipitate the desired product.

6. A method for preparing N,N'-thiobis(ethylene)-bis [2-(o-hydroxyphenyl)glycine] having the formula

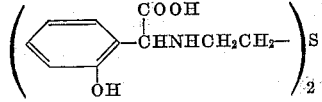

which comprises treating the dihydrohalide salt obtained as described in claim 5 with aqueous alkali to a pH of about 2 to precipitate the desired product in the reaction mixture.

References Cited in the file of this patent

Kroll et al.: J. A. C. S., vol. 79, p. 2024 (1957).